March 29, 1966
J. W. HUFFMAN
3,243,556
COMBINED CURRENT CONNECTOR AND CIRCUIT CONTROLLING
MEANS FOR AN APPLIANCE
Filed Jan. 13, 1964
2 Sheets-Sheet 1
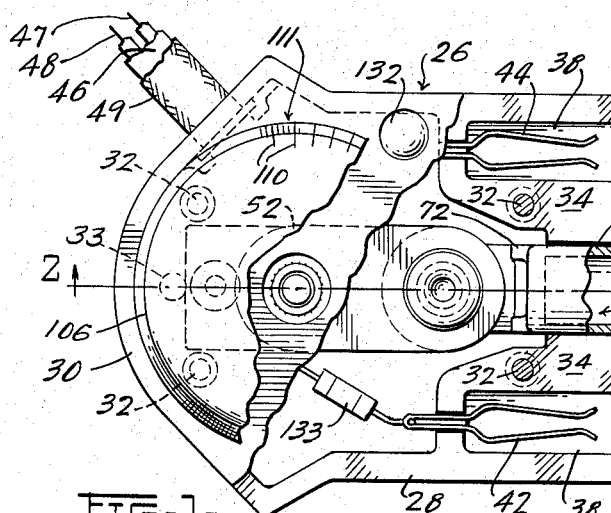
FIG-1-
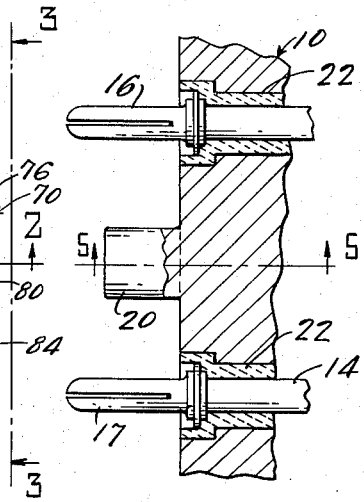
FIG-4-
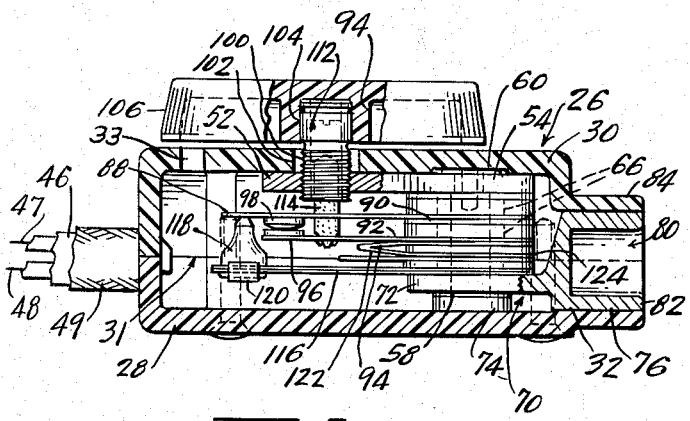
FIG-2-
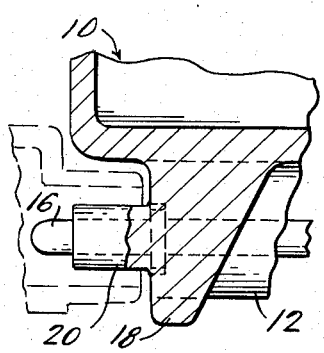
FIG-5-
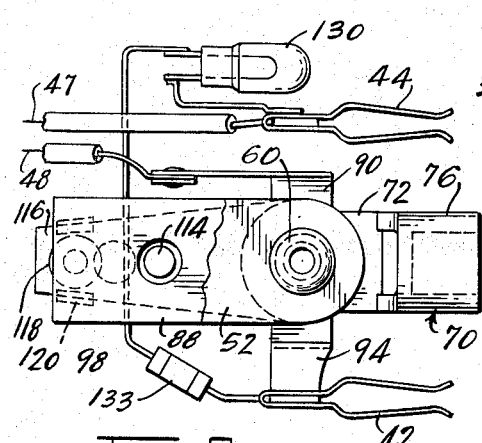
FIG-6-
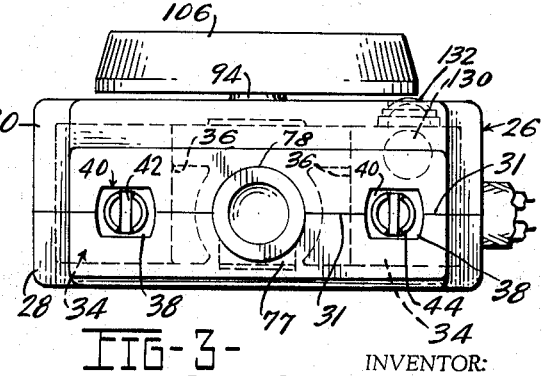
FIG-3-
INVENTOR:
JOHN W. HUFFMAN.
BY
Harry O. Ernsberger
ATT'Y.

March 29, 1966 J. W. HUFFMAN 3,243,556
COMBINED CURRENT CONNECTOR AND CIRCUIT CONTROLLING
MEANS FOR AN APPLIANCE
Filed Jan. 13, 1964 2 Sheets-Sheet 2
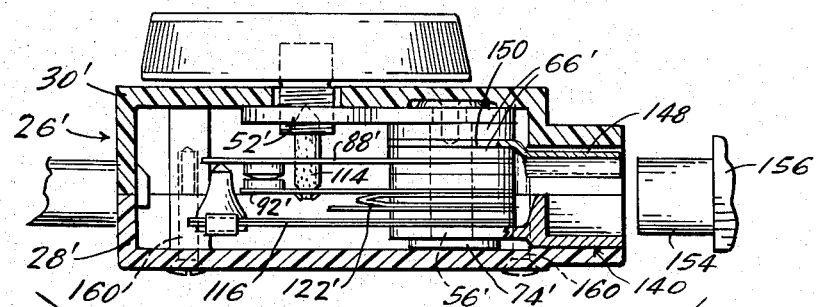
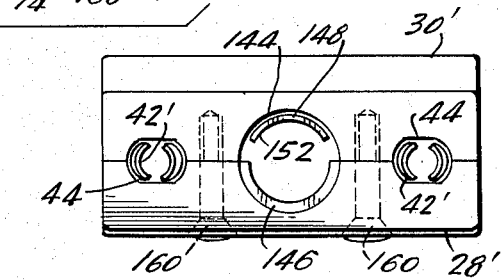
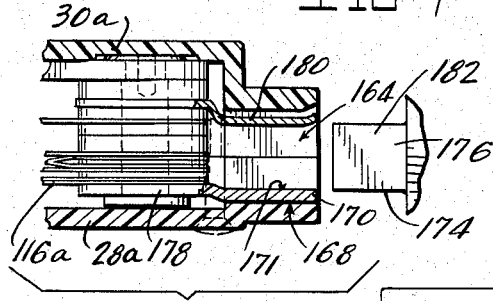
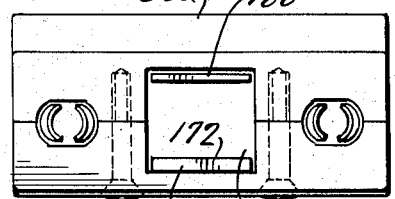
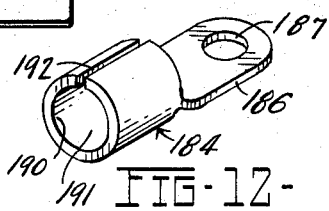
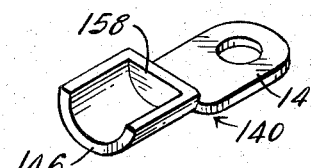
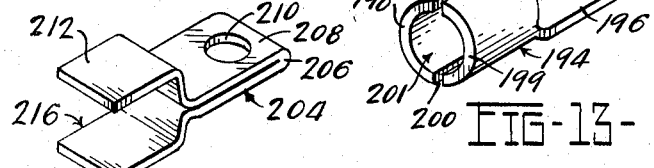
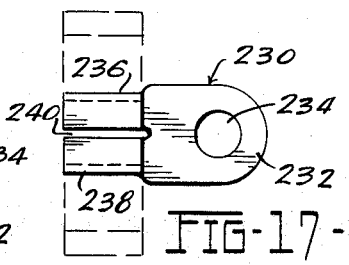
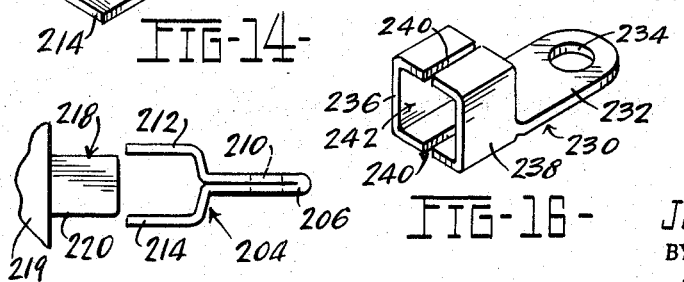
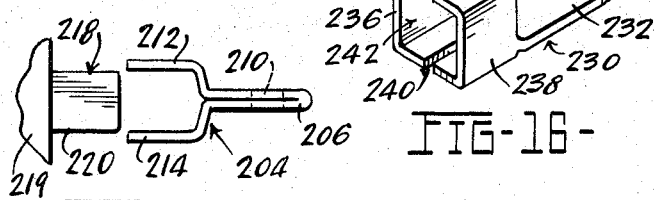
INVENTOR:
JOHN W. HUFFMAN.
BY
Harry O. Ernsberger
ATT'Y.

United States Patent Office 3,243,556
Patented Mar. 29, 1966

3,243,556
COMBINED CURRENT CONNECTOR AND CIRCUIT CONTROLLING MEANS FOR AN APPLIANCE
John W. Huffman, Mansfield, Ohio, assignor to Pace, Inc., Mansfield, Ohio, a corporation of Ohio
Filed Jan. 13, 1964, Ser. No. 337,196
5 Claims. (Cl. 200—136.5)

This invention relates to thermoresponsive switch mechanism and more especially to manually adjustable switch mechanism embodying thermoresponsive means for maintaining automatic control of a circuit of an electrically energizable heating means of an appliance or heating unit.

In the manufacture of cooking utensiles embodying electrically energizable heating units, such as electrically heated skillets, it has been a practice to provide a manually adjustable thermoresponsive switch means as an independent control unit adapted to be connected with a cooking utensil wherein the skillet or utensil is fashioned with a cylindrical chamber or walled opening to receive and accommodate a heat conducting or heat transfer bar projecting from the switch control unit when connected with the appliance to transfer heat to a thermoresponsive component of the switch control unit.

In arrangements of this character, the heat transfer bar of the switch or control unit projects a substantial distance from the housing of the control unit. Skillets or other cooking appliances must necessarily be periodically washed and the cylindrical chamber receiving the heat transfer bar is of comparatively small diameter requiring a special cleaning instrument in order to cleanse the elongated chamber of foreign matter. In such construction, the heat transfer bar, extending a substantial distance from the housing of the switch or control unit is liable to be damaged to an extent rendering the control inoperative. Such control units are designated probe thermostats, the heat transfer bar or component being referred to as a probe.

The present invention embraces a current supply connector and control unit embodying a thermoresponsive switch mechanism fashioned with a recess or chamber associated with a heat transfer member adapted to cooperate with a heat conducting projection on the electrically heated appliance for effectively transferring heat from the appliance to the thermoresponsive means to accurately maintain the appliance at a desired temperature.

An object of the invention is the provision of a manually adjustable thermoresponsive switch mechanism in combination with a heat transfer member wherein the switch mechanism and the heat transfer member are enclosed within a housing of insulating or noncurrent conducting material whereby to reduce liability of damage to the unit.

Another object of the invention resides in a control unit and appliance construction wherein the electrically heated appliance is provided with a comparatively short length projection arranged to be received in a recess in the control unit in heat transferring relation with a heat conducting or transfer element of the control unit simplifying the construction of the appliance and the control unit and effectively maintaining accuracy of temperature control of the appliance.

Another object of the invention is the provision of a disconnectable control unit for an electric heating unit of an appliance wherein recesses or chambers in the appliance for the reception of heat transfer means are eliminated thereby facilitating cleaning of the appliance without the use of special cleaning instruments.

Another object of the invention resides in a thermoresponsive switch control unit for a cooking appliance wherein the heat transfer component of the control unit is of comparatively short length reducing the length of the heat transfer path from a projection on the appliance to the thermoresponsive means of the switch control unit whereby a more effective transfer of heat to the thermoresponsive means is attained and thereby automatically maintain accurate control of the temperature of the appliance.

A further object of the invention is the provision of means disposed adjacent a thermoresponsive component of a manually adjustable switch mechanism for supplying supplemental heat to accelerate operation of the thermoresponsive element whereby an abnormally high temperature or "over shooting" of the temperature of the appliance from an initial "cold" or unenergized condition is greatly reduced and the temperature of the heated appliance maintained at a more nearly uniform or constant temperature for which the switch mechanism is adjusted.

Still a further object of the invention is the provision of a manually adjustable thermoresponsive switch means in combination with a heat transfer member of short length for transferring heat from an appliance to the thermoresponsive means of the switch mechanism effective to foster rapid cycling of the switch means to automatically maintain the temperature of the appliance within minor temperature variations from a median temperature for which the switch means may be adjusted.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 1 is a top plan view of one form of the control unit of the invention with a portion of the housing broken away for purposes of illustration;

FIGURE 2 is a longitudinal sectional view taken substantially on the line 2—2 of FIGURE 1;

FIGURE 3 is an end view of the control unit as viewed on the line 3—3 of FIGURE 1;

FIGURE 4 is a fragmentary sectional view of a portion of an electrically heated appliance to be controlled by the control unit;

FIGURE 5 is a fragmentary detail sectional view taken substantially on the line 5—5 of FIGURE 4;

FIGURE 6 is a top plan view of the switch mechanism and circuit connections preparatory to assembly in the housing;

FIGURE 7 is an elevational view illustrating a modified form of control means or unit of the invention, certain portions being shown in section;

FIGURE 8 is an end view of the construction shown in FIGURE 7;

FIGURE 9 is an isometric view illustrating a heat transfer member embodied in the unit shown in FIGURES 7 and 8;

FIGURE 10 is a fragmentary view of a portion of a control unit illustrating a modified arrangement of heat transferring means;

FIGURE 11 is an end view of the construction shown in FIGURE 10;

FIGURE 12 is an isometric view illustrating a modified form of heat transfer member;

FIGURE 13 is an isometric view illustrating another form of heat transfer member;

FIGURE 14 is an isometric view illustrating another form of heat transfer member;

FIGURE 15 is an elevational view of the heat transfer member shown in FIGURE 14 in combination with a projection formed on the appliance arranged for cooperation with the heat transfer member;

FIGURE 16 is an isometric view illustrating another form of heat transfer member, and FIGURE 17 is a top plan view of the heat transfer means shown in FIGURE 16 illustrating the method of forming same from a flat blank.

While the control unit of the invention embodying thermoresponsive means and heat transferring component is especially adapted as a unit connector and circuit controlling means for use with various types of cooking appliances embodying electrical heating units where accurate control of temperature is to be maintained, it is to be understood that the control unit of the invention may be utilized with appliances and heating units generally wherever thermoresponsive control of a circuit may be desirable or necessary.

Referring to the drawings in detail, FIGURES 4 and 5 illustrate a portion of a cooking appliance such as a skillet or fry pan 10 having a boss portion 12 enclosing and supporting an electrically energizable heating unit 14, the cooking appliance or utensil 10 being equipped with male terminals 16 and 17, the appliance heating unit 14, the terminals 16 and 17 being adapted to be supplied with current through the control unit of the invention.

The cooking appliance 10 is provided with supporting legs or projections 18, one of which is shown in FIGURE 5, and with a cylindrically shaped heat transfer projection or heat conducting portion 20 disposed midway between the terminals 16 and 17 as shown in FIGURE 4. The projection 20 is adapted to conduct heat from the appliance or utensil 10 to the control unit of the invention. The terminals 16 and 17 of the heating unit 14 are insulated from the utensil 10 by means of insulating members 22.

The portion of the appliance illustrated in FIGURES 4 and 5 and the control unit illustrated in FIGURES 1 through 3 and 6 are illustrated as approximately twice actual size. The circuit controlling unit shown in FIGURES 1 through 3, is of a character which is readily connectable with and removable from an appliance.

The switch mechanism, thermoresponsive means, heat transfer means and a pilot lamp are enclosed within a suitable housing 26 fashioned of rigid insulating material, the housing 26 comprising a base portion or section 28 and a cover portion or section 30, the housing sections 28 and 30 adapted to mate at the juncture line 31 and are held together by screws 32 extending through openings in section 28 into threaded openings in bosses in section 30.

The lower section or portion 28 is provided with a pair of boss portions 34 and the cover or upper portion 30 of the housing formed with downwardly extending boss portions 36 which mate with the pair of boss portions 34 at the juncture line 31 shown in FIGURES 1 and 3. Each of the boss portions 34 is provided with an elongated recess 38 and each of the boss portions 36 provided with an elongated recess 40 of the same configuration as the recesses 38, the recesses mating in the manner illustrated in FIGURE 3.

One of the chambers formed by one pair of recesses 38, 40 accommodates a female type connector clip or terminal 42 and the elongated chamber provided by the other mating recesses accommodate a female connector clip or terminal 44 of the same construction as the clip or terminal 42, the positions of the terminals in the housing being illustrated in FIGURES 1 and 3. The terminals or clips 42 and 44 are of conventional construction.

The housing components or sections 28 and 30 are respectively formed with semicircular recesses to accommodate an insulation sheath 46 encasing or enclosing current supply conductors or lead wires 47 and 48 arranged to be connected in a conventional manner with a current supply. The recesses in the components 28 and 30 are shaped to accommodate an end region of a coiled spring-like member 49 which surrounds the insulation sheath 46 at its region of entry into the housing 26 in order to protect the current conductors against severe flexure.

The switch mechanism, thermoresponsive means and a heat transfer or heat conducting bar or member are assembled into a so-called "stack" which provides a construction occupying a comparatively small space in the housing. The switch mechanism is of the general character disclosed in the U.S. patent to Cassidy No. 3,064,102, granted Nov. 13, 1962. The switch mechanism is inclusive of frame components comprising a plate or member 52, the plate being formed with an opening into which extends a tenon portion 54 of a cylindrical metal member 56, the lower end of the member 56 being formed with a flange 58 which engages an inner surface of the housing component 28 as shown in FIGURE 2.

The several components of the switch mechanism and the thermoresponsive means are assembled on the cylindrical member 56 and, after assembly, the upper end region of the tenon portion 54 is swaged over the upper surface of the plate 52 as illustrated at 60 in FIGURE 2.

The stacked switch assembly is secured in the housing 26 by the cover member or section 30 as the lower surface thereof engages the frame plate 52 and the lower housing section 28 engages the flange 58 on the cylindrical frame member 56. The switch members, the terminals for the switch members and the thermoresponsive means are insulatingly supported upon the cylindrical member 56 by a plurality of ceramic or lava insulating discs 66.

The arrangement of the invention includes a heat conducting or heat transfer bar or member 70 having a flat portion 72 provided with an opening to be received on the cylindrical member 56 in the manner shown in FIGURE 2, an insulating washer such as a disc of mica 74 being disposed between the flange 58 and the flat portion 72 of the heat transfer bar. The heat transfer bar 70 is provided with an integral generally cylindrical portion 76 which is accommodated in semicylindrically shaped mating recesses 77 and 78 formed in the forward regions of the housing components 28 and 30.

The cylindrical portion 76 of the heat transfer bar or member 70 is of comparatively short length as shown in FIGURES 1 and 2 and is fashioned with a cylindrically shaped bore, chamber or cavity 80 which slidably yet snugly receives the projection 20 on the appliance 10 when the control unit is connected with the appliance to engage the terminals 16 and 17 in the terminal clips 44 and 42.

The diameter of the cavity or cylindrical chamber 80 is only a few thousandths of an inch greater than the diameter of the projection 20 on the appliance in order that there be a minimum of air space between the projection 20 and the walls defining the cavity or chamber 80 when the projection is telescoped into the chamber 80.

Due to the arrangement wherein the female terminal clips 42 and 44 are loosely mounted in the recesses 38 for slight relative movement to accommodate the male terminals 16 and 17 of the heating element of the appliance, the projection 20 at some region on its periphery will engage the metal wall surface defining the chamber 80 so that there is metal-to-metal heat conducting contact assisting in efficient heat transfer from the projection 20 to the heat transfer bar 70 by conduction, radiation and convection, convection transfer being through the minute air space between the projection 20 and the interior wall defining the chamber 80.

It should be noted that the forward end 82 of the bar 70 is preferably coincident with the frontal face 84 of the housing construction 26 whereby the heat transfer bar 70 is substantially completely enclosed or embraced within the housing components 28 and 30 in the manner illustrated in FIGURES 1, 2 and 3.

The switch assembly is inclusive of a first flexible current conducting switch arm or member 88 adapted to be influenced by a thermoresponsive means 116 in a manner hereinafter described for maintaining the appliance at a temperature for which a manual control may be adjusted. The switch arm 88 is provided with an opening and is received upon one of the lava insulating discs 66. A terminal member 90 in direct metallic contact with the switch arm 88 is also supported upon a lava insulating disc 66 whereby the switch member 88 and terminal 90 are insulatingly supported by the cylindrical member 56.

A second flexible current-conducting switch member 92 and a second terminal 94 are provided with openings to be received on one of the lava discs 66 whereby the switch member 92 and the terminal 94 are insulatingly supported upon the cylindrical member 56, one of the lava discs 66 being disposed between the terminal 90 and the switch member 92 as shown in FIGURE 2. The switch arms 88 and 94 are respectively provided with cooperating contacts 96 and 98 arranged as shown in FIGURE 2 for making and interrupting a circuit through the heating unit 14 of the appliance 10.

Means is provided for manually adjusting the relative position of the switch arm 92 and its contact 96. The frame plate 52 is provided with a threaded opening to receive a threaded member or bushing 100 extending upwardly through an opening 102 in the housing section 30.

The upper portion of the bushing 100 is provided with a serrated portion 104 which is received in a serrated recess formed in a manually rotatable disc-like control member 106, the intermeshing serrated surfaces of the member 100 and the member 106 providing an interconnecting means whereby rotation of the member 106 effects corresponding rotation of the threaded bushing 100.

The peripheral surface region of the member 106 is provided with graduations 110 cooperating with an index line 111, the graduations indicating various temperatures for the appliance for which the switch mechanism may be manually set or adjusted. The bushing 100 is fashioned with a threaded bore adapted to accommodate an adjusting screw 112, a strut member 114 of lava or other insulating material extending into the lower region of the threaded bore in the bushing 100, the strut projecting through an opening in switch member 88, the lower end engaging the second switch member 92, the upper end of the strut being engaged by the end of the threaded member 112.

The purpose of the threaded member 112 is to provide means for initially adjusting the position of the second switch member 96 to establish the proper correlation of the initial position of the switch member 92 relative to the manually adjustable member 106. The lower end of the lava strut or member 114 is preferably wedge-shaped and extends into a suitable recess in the switch member 92 to prevent relative rotation of the switch member 114 during manual rotation of the member 106.

The construction includes a thermoresponsive means preferably comprising a bimetal element 116 having an opening therein to be received on the cylindrical member 56 and being in direct contact with the flat portion 72 of the heat transfer bar or member 70 as shown in FIGURE 2 to provide efficient transfer of heat to the bimetal element 116. The element 116 is of conventional character being fashioned of dissimilar metals whereby temperature variations effect flexure of the element.

The distal end region of the bimetal element 116 supports a rigid strut member 118 formed of lava or other heat resistant insulating material, the strut 118 being secured to the bimetal element 116 by a clip 120. The upper end of the strut 118 is arranged to engage an end region of the switch arm 88 to change the relative position thereof by flexure of the bimetal element caused by temperature variations.

Disposed adjacent the bimetal element 116 is a supplemental electrically energizable resistance heater 122, the supplemental heater 122 being insulated from the bimetallic element by means of a mica sheet 124 or other suitable insulating material. The supplemental heater 122 is connected in the circuit of the switch arms whereby the supplemental heater is energized when the contacts 96 and 98 are engaged to establish current flow to the appliance heating element 14 and is de-energized when the contacts 96 and 98 are separated.

The circuit connections for the switch mechanism and the connector terminals are illustrated in FIGURE 6. The current supply conductor 47 is connected with the terminal clip 44. The current supply conductor 48 is connected with the terminal member 90 of the switch construction for conveying current to the switch arm 88. The terminal 94 is engaged with the second switch arm 92 and with the terminal clip 42. The circuit to the heating element 14 of the appliance, through engagement of the male terminals 16 and 17 respectively with female terminals 44 and 42, is completed or interrupted by engagement and disengagement of the contacts 96 and 98 carried by the switch arms 88 and 94.

A pilot lamp 130 is disposed within the housing beneath a glazed window 132, the lamp being connected with the female connectors 42 and 44 as shown in FIGURE 6 whereby completion of the circuit through engagement of the contacts 96 and 98 energizes the lamp 130 indicating the periods when current flow is established to the appliance. A fuse 133 is intercalated in the pilot lamp circuit. Through the arrangement embodying the supplemental heater 122, the automatic cycling of successive engagement and disengagement of the contacts 96 and 98 under the influence of changes in position of the bimetal element 116 is accelerated to thereby maintain critical control of the temperature of the appliance.

It may be desirable to vent the housing construction to facilitate dissipation of heat. One or more openings 33 may be provided in the upper wall of the housing section 30 for this purpose.

The operation of the arrangement disclosed in FIGURES 1 through 6 is as follows: The control unit of the invention is connected to the appliance 10 by engaging the male terminals 16 and 17 with the female terminals 42 and 44 by moving the control unit in a right-hand direction toward the appliance as viewed in FIGURES 1 and 4. Movement of the control unit toward the appliance telescopes the wall defining the chamber or cavity 80 of the heat transfer bar 70 over the projection 20 formed on the appliance 10 whereby when the control unit is in fully connected position with respect to the appliance, the cylindrically shaped projection 20 occupies substantially the entire volume of the cavity or chamber 80 of the heat transfer bar 70.

Due to the resiliency of the spring-like members forming the female clips or terminals 42 and 44, the peripheral surface of the projection 20 may be in direct metallic contact with a fraction of the surface area defining the cavity 80. Through this metal-to-metal contact and the proximity of the peripheral surface of the projection 20 on the appliance with the cylindrical surface defining the cavity 80, effective and efficient transfer of heat from the projection 20 of the appliance through the heat transfer bar 70 is assured whereby heat is rapidly transferred from the appliance to the bimetal element 116 to influence the relative position of said element.

The control knob or member 106 is rotated or adjusted to bring the desired temperature indication in registration with the index 111. Rotation of the knob or dial 106 effects relative rotation of the threaded bushing 100 with respect to the frame plate 52, which rotation is transferred by the strut 114 to the second switch member 92 to a particular position. When the appliance is "cold," the thermoresponsive means or bimetal element 116 is in its lowermost position and the strut 118 is out of engagement with the first switch arm 88.

The contacts 96 and 98 are in engagement or closed position, completing a circuit through the heating unit 14 of the appliance. During the period that current flows through the appliance, current flow is established to the pilot lamp 130 and the supplemental heater 122, the latter being of a resistance value generating a small quantity of heat to exert an accelerating influence on the bimetal element 116 in addition to the influence of the heat transferred to the bimetal element through the heat transfer bar 70 from the appliance projection 20.

As the appliance becomes heated, the heat transferred to the bimetal element 116 through the heat transfer bar 70 flexes the bimetal element 116 upwardly, accelerated by heat generated by the supplemental heater 122. The bimetal element being thus flexed upwardly engages the lava strut 118 with the switch member 88 and elevates the switch member 88 to disengage the contacts 96 and 98 interrupting the circuit through the appliance heating element 18, the circuit of the pilot lamp 130 and the circuit through the supplemental heater 122.

When the appliance is "cold," the first or initial application of electric current in the heating element 14 results in a comparatively slow transfer of heat to the bimetal element 116, and the temperature of the appliance will usually overrun or "overshoot" the temperature setting for which the dial 106 has been adjusted. Cessation of current flow to the appliance heating unit 14 causes the appliance temperature to be reduced, the bimetal element 116 cools and, by reason of its cooling, the element 116 flexes downwardly to move the strut 118 downwardly effecting reengagement of the contacts 96 and 98 and current flow reestablished through the heating element 14, the supplemental heater 122 and the pilot lamp 130.

Heating of the appliance continues during energization of the heater 14 and, through the transfer of heat from the appliance through the projection 20 and the heat transfer member 70 to the bimetal element 116, the element is again flexed upwardly, moving the switch member 88 to separate the contacts 96 and 98. As the heat transfer bar 70 is in direct metallic contact with the bimetal element 116, rapid transfer of heat to the bimetal element takes place so that minute changes in temperature of the appliance influence the bimetal element 116 to repeatedly and automatically engage and disengage the contacts and thereby accurately control the temperature of the appliances.

This recycling continues automatically and the temperature of the appliance is held within a very narrow range, closely approaching a uniform temperature. In order to change the temperature of the appliance, the dial 106 is rotated or readjusted to a desired position which movement changes the relative position of the second switch member 92 thereby effecting the temperature of the appliance through the flexing of the bimetal element 116 under the influence of heat transferred from the appliance to the bimetal element.

As the supplemental heater 122 is energized concomitantly with energization of the appliance heating unit 14, cycling of the bimetal element is accelerated and, after the appliance has been brought to the temperature at which it is to be maintained, the bimetal element closely follows the minute variations in temperature of the appliance without any appreciable overrun or overshooting of the temperature of the appliance. On initial heating of the appliance from a "cold" start, the supplemental heat from the heating unit 122 accelerates the flexure of the bimetal element 116 to minimize the initial "temperature overrun" at the start of the heating cycle.

The heat transfer bar or cavity probe 70 is fashioned of metal having relatively high heat conductivity, such as aluminum or metals having similar heat conducting characteristics.

It is found that the cavity 80 receiving the projection 20 may be of comparatively short length and secure effective and efficient heat transfer from the projection 20 to the bimetal element 116. However in order to provide a compact control unit, the cavity 80 is preferably of a length just sufficient to secure effective heat transfer to the bimetallic element 116.

While the cavity 80 is illustrated as of circular cylindrical configuration to receive a cylindrically shaped projection 20 on the appliance, it is to be understood that the cross-sectional contour of the cavity 80 and the cross-sectional shape of the projection 20 may be of other configuration such as a square cross-section or a polygonally shaped cross-section. With the control unit or arrangement of the invention, it is unnecessary to fashion the appliance with a recess or other passage to receive a probe bar on the control unit and hence cleaning of the appliance is more easily accomplished as the projection 20 may be readily kept free of foreign matter so that continued effective heat transfer from the projection 20 to the heat transfer bar 70 is assured.

FIGURES 7 and 8 illustrate a modified form of the control unit of the invention embodying a heat transfer means or bar of the character illustrated in FIGURE 11. In this form of construction the housing 26' comprises housing sections 28' and 30' of the character illustrated in FIGURES 1 through 3.

The switch assembly contained in the housing 26' is similar to that illustrated in FIGURE 2 and is inclusive of a frame plate 52', a cylindrical metal frame member 56' supporting components of the switch mechanism, a plurality of insulating discs 66' assembled on the cylindrical member 56' for insulating components of the switch mechanism from the member 56'. Mounted on the member 56' and insulated therefrom by insulating discs 66' are a first switch member 88', a second switch member 92', a bimetal element 116' and a supplemental heater 122', the latter providing supplemental heat for influencing the bimetal element 116' when the contacts on the switch arm 88' and 92' are engaged.

The heat transfer or heat conducting member 140 is inclusive of a flat or planar portion 142 which is assembled on the member 56' and is in direct metallic contact with the bimetal element 116' as shown in FIGURE 7, a flange 74' engaging the lower surface of the planar portion 142 to secure the same in assembled relation on member 56'. The housing sections 28' and 30' are formed with semicircular recesses which mate to provide a cylindrically shaped chamber or cavity 144. Disposed in the chamber 144 and integrally formed with the planar portion 142 is a semiannularly shaped portion 146 as particularly shown in FIGURE 8.

Disposed above the portion 146 is a spring plate 148 having an extension 150 which is supported between insulating discs 66' in the "stacked" switch assembly shown in FIGURE 7. The portion 148 is preferably of arcuate or curved cross-section, the curvature of the inner surface 152 being of substantially the same radius as the inner curved surface of the portion 146 of the heat transfer bar 140. The cavity or region defined by the inner surface of the portion 146 and the inner surface 152 of the spring plate 148 is adapted to receive a circular cylindrically shaped projection 154 provided on the skillet or other electrically heated appliance 156, a portion of which is shown in FIGURE 7 adjacent the control unit.

The diameter of the projection 154 is substantially the same as the diameter of the cavity provided by the portion 146 and the spring plate 148 so as to be snugly received between members 146 and plate 148. The member 148 may be formed of stainless steel or similar material and tensioned or stressed slightly downwardly so as to be flexed upwardly by the projection 154 when the projection telescoped between the portion 146 and the spring plate 148 so as to provide metal-to-metal contact between the projection 154 and the semiannular portion 146 of the heat transfer bar.

The housing sections 28' and 30' are provided with recesses or chambers to accommodate female terminals 42' and 44', as shown in FIGURE 8, which engage male terminals of the electrically energizable heating unit of the appliance 156. The heat transfer bar or member 140 is preferably formed of aluminum or other metal having high heat conductivity characteristics to efficiently transfer heat from the projection 154 on the appliance 156 to the bimetal element 116' of the control unit.

When the projection 154 is in telescoped relation with the portion 146 of the heat transfer bar and the spring plate or member 148, there is only a small amount of air space in the cavity in the housing sections accommodating these components whereby the cavity is substantially closed to minimize heat losses.

The juncture of the portion 146 with the planar portion 142 may be provided with a partition or abutment 158 and, if desired, the depth of the cavity provided by the semi-annular portion 146 may be of a dimension whereby the outer end of the projection 154 may contact the abutment 158, but such contact is not essential to the effective transfer of heat from the projection to the bimetal element 116' by reason of the comparatively large contacting surface areas of the projection 154 with the portion 146. The partition 158 may be employed in order to further minimize heat loss.

The switch assembly including the support members 52' and 56', the switch members, the bimetallic element, the heat transfer bar 140 and the spring plate 148 are pre-assembled and secured to the frame plate 52' through the support member 56'. This assembly is inserted in the lower housing section 28' and the upper section 30' fitted to the lower section. The housing sections held together by means of screws 160 extending through openings in the housing section 28' and into threaded openings in the housing section 30'.

In assembled relation, the flange 74' on the heat transfer bar is in engagement with the inner surface of the bottom wall of the section 28' and the inner surface of the upper section 30' of the housing engages the plate 52' so that when the securing screws 160 are drawn up, the switch assembly and heat transfer member are secured in fixed position within the housing.

The operation of the control unit illustrated in FIGURES 7 and 8 is the same as the control unit shown in FIGURES 1 through 6, the bimetal element 116' being under the influence of heat transferred from projection 154 through the heat transfer member 140 to the bimetal element to maintain the appliance at the temperature for which the switch means is manually adjusted as hereinbefore described in connection with the form of the invention illustrated in FIGURES 1 through 6.

FIGURES 10 and 11 illustrate a control unit similar to that shown in FIGURES 7 and 8 but with the heat transfer bar or member configured to accommodate a flat or planar surface of a projection provided on an appliance. In this form the housing sections 28a and 30a are substantially the same as those illustrated in FIGURES 7 and 8 with the exception that the cavity 164 provided in the forward region of the housing sections is of generally rectangular configuration in cross-section.

The heat transfer member 168 is fashioned with a planar or flat portion 170, the upper surface 171 of which is arranged for direct contact with a lower surface 174 of a rectangularly shaped projection 176 provided on the appliance when the projection 176 extends into the cavity 164. The heat transfer member 168 is provided with a flat portion 178 assembled in the "stacked" switch construction with the portion 178 in direct metallic contact with the bimetal element 116a.

Also assembled in the "stacked" switch construction is a spring plate 180 which is adapted to engage the upper surface 182 of the projection 176 when the latter is disposed in the cavity 164. The spring plate member 180 is assembled in the "stacked" switch construction in substantially the same manner as the plate member or spring 148 is assembled in the switch assembly illustrated in FIGURE 7.

The spring plate 180 is preferably tensioned or stressed in its normal position whereby when the projection 176 is inserted in the cavity 164 of the control unit, the plate spring 180 is flexed slightly upwardly so as to exert pressure on the projection 176 to establish good metallic contact between the lower surface 174 of the projection and the adjacent surface 171 of the heat transfer bar 170. The operation of the control unit of FIGURES 10 and 11 is the same as that of the other forms of the invention hereinbefore described.

FIGURE 12 illustrates another form of heat transfer member or bar for use in the control means of the invention. The heat transfer bar 184 is fashioned of metal having high heat conductivity characteristics, such as aluminum, and is configured with a flat or planar portion 186 provided with an opening 187 to facilitate its assembly in a "stacked" switch construction of the character shown in FIGURE 2 and hereinbefore described. The heat transfer bar 184 is fashioned with a generally cylindrical portion 190 with a small space or gap 192 provided between the end regions of the curved portions forming the cylindrical configuration 190.

The cylindrical configuration 190 provides a cavity 191 adapted to snugly, yet slidably, receive a circular cylindrically shaped projection of the character shown in FIGURE 4 provided on an electrically heated appliance with which the control unit may be used.

The configuration 190 is of substantially the same diameter as the exterior diameter of the appliance projection to facilitate metal-to-metal contact between the projection on the appliance and the heat transfer bar 184. Through the provision of the gap 192, metal-to-metal contact with the projection on the appliance may be maintained as this construction provides for expansion and contraction under temperature variations without impairing heat transferring relation with the projection on the appliance.

FIGURE 13 illustrates a modified form of heat transfer bar 194 which is similar to the construction shown in FIGURE 12. The heat transfer member 194 includes a flat or planar portion 196 having an opening 197 to facilitate its assembly in a "stacked" switch construction of the character hereinbefore described. The member 194 is fashioned with two semi-annular portions 198 and 199 integrally joined with the flat portion 196 forming a cavity 201. The semiannularly shaped portions 198 and 199 are separated by small gaps or spaces 200 to facilitate snug yet slidable engagement with a cylindrical projection on an appliance whereby metal-to-metal contact is established for the effective and efficient transfer of heat from a projection on the appliance to the bimetal element of the switch construction.

FIGURES 14 and 15 illustrate another form of heat transfer bar 204 fashioned of a strip of aluminum or other metal having high heat conductivity, the strip being bent upon itself as at 206 to provide a dual layer planar or flat portion 208.

The layers are provided at the flat portion with registering openings 210 to facilitate assembly of the heat transfer member in a "stacked" switch construction of the character hereinbefore described.

As shown in FIGURES 14 and 15, the forward portions 212 and 214 of the strip forming the heat transfer bar are disposed in spaced relation forming a cavity 216 to accommodate a projection 218 formed on the electrically heated appliance 219. The projection 218 on the appliance is preferably of rectangular cross-section whereby the upper and lower surfaces 220 thereof snugly engage the inner surfaces of the portions 212 and 214 of the heat transfer bar 204 to establish metal-to-metal contact between the projection 220 and the spaced portions 212 and 214 of the heat transfer bar to foster efficient conduction of heat to a bimetal element of the switch construction.

FIGURES 16 and 17 illustrate another form of heat transfer bar or member 230 comprising a single strip of metal, such as aluminum, fashioned with a planar or flat portion 232 provided with an opening 234 to facilitate its assembly in a "stacked" switch construction of the character hereinbefore described, the planar portion 232 being adapted for direct contact with a bimetal element or thermoresponsive means of the switch construction.

In the form shown in FIGURES 16 and 17, member 230 is inclusive of two U-shaped portions 236 and 238 integrally formed with the flat or planar portion 232, the U-shaped configurations being in opposed relation, the extremities of the leg portions of the U-shaped configurations being separated by small spaces or gaps 240.

The substantially closed configuration or cavity 242 provided by the U-shaped configurations 236 and 238 is of rectangular or square configuration to receive a projection on an appliance of square or rectangular configuration which is snugly yet slidably received in the cavity 242 in heat transferring relation with the member 230 to provide for efficient and effective transfer of heat to the bimetallic element of a "stacked" switch construction in contact with the flat portion 232.

The broken line configuration in FIGURE 17 illustrates the method of forming the heat transfer bar 230 from a flat strip of metal. The portions 236 and 238 are formed by bending the portions of the flat strip along the broken lines illustrated in FIGURE 17 to form the configuration shown in FIGURE 16.

It is apparent that, within the scope of the invention, modifications and different arrangements may be made other than as herein disclosed, and the present disclosure is illustrative merely, the invention comprehending all variations thereof.

I claim:

1. A combined current connector and circuit controlling means for use with an electrically energizable heating element of an appliance provided with a heat conducting projection and electric circuit terminals, said means including a housing, said housing comprising two hollow mating sections of insulating material, a metal frame in said housing, a pair of terminal connectors supported in recesses in the housing adapted to be engaged with the terminals of the electrically energizable heating element, switch means in said housing including switch members insulatingly supported by said frame provided with cooperating contacts, thermoresponsive means in said housing mounted by said frame arranged to influence the position of one of the switch members, said housing sections having recesses providing a cavity and a heat transfer member in said housing mounted by said frame extending into the cavity and arranged in heat transferring relation with the thermoresponsive means, said heat transfer member having a recess arranged to receive the projection on the appliance for transferring heat to the thermoresponsive means when the circuit controlling means is connected with the appliance.

2. A combined current connector and circuit controlling means arranged for removable connection with an electrically energizable heating unit of an appliance provided with a metal projection and electric circuit terminals, said circuit controlling means including a housing, said housing comprising two hollow mating sections of insulating material, a metal support frame in said housing, a pair of terminal connectors disposed in recesses in the housing adapted to be engaged with the terminals of the electrically energizable heating unit, switch means in said housing including switch members insulatingly supported by said frame and provided with cooperating contacts, thermoresponsive means mounted by said frame in said housing arranged to influence the position of one of the switch members, manually operable means mounted by said frame for controlling another of the switch members, said housing having a cavity, a heat transfer metal member in said housing in heat transferring relation with the thermoresponsive means, a portion of said heat transfer member being disposed in said cavity and having a recess arranged to receive the projection on the appliance to effectively transfer heat from the projection to the thermoresponsive means when the projection extends into the recess.

3. A combined current connector and switch assembly for use with an electrically heated cooking appliance comprising, in combination, a housing, said housing comprising two hollow mating sections of insulating material, a metal frame in said housing, a pair of terminal connectors disposed in recesses in the housing, switch means in said housing including a pair of switch members insulatingly mounted by said metal frame and provided with cooperating contacts, thermoresponsive means in said housing mounted by said frame arranged to influence the position of one of the switch members, manually operable means mounted on said frame accessible exteriorly of the housing for controlling the relative position of the other switch member, said housing having mating recesses providing a chamber at a region between said terminals, a heat transfer member in heat-transferring relation with the thermoresponsive means and having a portion disposed in the chamber in the housing, the portion of the heat transfer member in the chamber of the housing having a bore therein adapted to telescopingly receive a cylindrically-shaped heat-conducting portion of the appliance to effectively transfer heat to the thermoresponsive means.

4. A combined current connector and circuit controlling means for use with an electrically energizable heating unit of an appliance provided with a heat conducting projection and electric circuit terminals, said means including a housing, said housing comprising two hollow mating sections of insulating material, a pair of terminal connectors disposed in recesses in said housing sections and adapted to be engaged with the terminals of the electrically energizable heating unit, a stacked switch construction in said housing including a metal plate, a cylindrical member secured to said plate, a pair of switch members insulatingly supported on said cylindrical members provided with cooperating contacts, a bimetal element supported by said cylindrical member and arranged to influence the relative position of one of the switch members, manually operable means mounted by said plate for controlling the relative position of the other of said switch members, said housing sections being formed with mating recesses providing a cavity, a heat transfer member supported by said cylindrical member in heat transferring relation with the bimetal element, said heat transfer member having a portion disposed in said cavity and provided with a recess to receive the heat conducting projection of the appliance for transferring heat from the appliance to the bimetal element when the current connector and heat controlling means is connected with the appliance.

5. A combined current connector and circuit controlling means according to claim 4 wherein the heat conducting projection of the appliance is of circular cylindrical shape and the recess in the heat transfer member is of circular cylindrical shape to receive the heat conducting cylindrical projection of the appliance.

References Cited by the Examiner

UNITED STATES PATENTS

| | | | |
|---|---|---|---|
| 2,856,508 | 10/1958 | Kueser | 200—136 X |
| 3,064,102 | 11/1962 | Cassidy | 200—136 X |
| 3,078,360 | 2/1963 | Ulanet | 200—138 X |

BERNARD A. GILHEANY, *Primary Examiner.*

L. A. WRIGHT, *Assistant Examiner.*